United States Patent [19]

Saeki et al.

[11] Patent Number: 4,899,158

[45] Date of Patent: Feb. 6, 1990

[54] MOVING OBJECT DISCRIMINATING SYSTEM

[75] Inventors: Takashi Saeki; Takayuki Nii; Hirotake Fukui; Toshiro Mishina; Haruo Nakano; Hitoshi Sakakibara, all of Kadoma, Japan

[73] Assignee: Matsushita Electric Works, Ltd., Osaka, Japan

[21] Appl. No.: 243,833

[22] Filed: Sep. 13, 1988

[30] Foreign Application Priority Data

| Sep. 26, 1987 | [JP] | Japan | 62-242086 |
| Sep. 26, 1987 | [JP] | Japan | 62-242088 |
| Jan. 14, 1988 | [JP] | Japan | 63-5928 |
| Jan. 14, 1988 | [JP] | Japan | 63-5929 |
| Apr. 25, 1988 | [JP] | Japan | 63-101789 |

[51] Int. Cl.⁴ .............................................. G01S 13/78
[52] U.S. Cl. .......................................... 342/44; 342/50
[58] Field of Search ................. 342/44, 50; 340/825.54

[56] References Cited

U.S. PATENT DOCUMENTS

| 3,984,835 | 10/1976 | Kaplan et al. | 342/44 |
| 4,242,661 | 12/1980 | Henoch et al. | 342/44 |
| 4,333,078 | 6/1982 | Henoch et al. | 342/44 |
| 4,647,931 | 3/1987 | Mawhinney | 342/44 |

FOREIGN PATENT DOCUMENTS

8501583 4/1985 PCT Int'l Appl. ................. 342/44

Primary Examiner—Thomas H. Tarcza
Assistant Examiner—Gilberto Barron, Jr.
Attorney, Agent, or Firm—Burns, Doane, Swecker & Mathis

[57] ABSTRACT

A moving object discriminating system is arranged so that a signal transmitted from an interrogator is received by a responder where the signal received is processed at a control circuit, the processed signal is phase-modified by own stored data of the responder and returned to the interrogator as an answer signal, and the interrogator discriminates the moving object as based on the answer signal. The responder is thereby sufficiently minimized in size for achieving as improved mountability of the responder with respect to the moving object to be discriminated.

6 Claims, 8 Drawing Sheets

MOVING OBJECT DISCRIMINATING SYSTEM

TECHNICAL BACKGROUND OF THE INVENTION

This invention relates to a moving object discriminating system and, more particularly, to a system in which data stored in a responder mounted to a moving object are transmitted by means of microwaves or the like electromagnetic waves in non-contacting state with an interrogator at a remote position for discriminating the moving object.

The moving object discriminating system of the kind referred to can be effectively employed for discriminating respective passing vehicles, carrying out physical distribution management and so on.

DISCLOSURE OF PRIOR ART

In general, the moving object discriminating system comprises the interrogator and responder, the interrogator is located at a fixed position while the responder is carried by such moving object as a vehicle, physical member or the like to be discriminated from other, an exchange of communication is carried out from the interrogator side for transmission of own data of the responder to the interrogator, and the data of discrimination code for the particular moving object is transmitted.

As one of the moving object discriminating system of the kind referred to, there has been suggested a device in U.S. Pat. No. 4,242,661 to Bengt T. Henoch et al, in which, in writing the data in a responder, an AM-modified signal transmitted from an oscillator on an interrogator side is detected on the side of the responder and provided into a control means, whereas, in reading the data, a non-modulated signal from the interrogator side oscillator is provided into a 3-dB hybrid circuit on the responder side, two phase-controlled outputs are provided from the hybrid circuit respectively to a phase modulator to synthesize them into an answer signal to be returned from the responder to the interrogator.

According to this system of Henoch et al, however, it has been required to incorporate in the control means or independently a phase control circuit, and to be provided with a set of phase modulating circuit and synthesizing circuit, so that there have been problems in that the responder side circuit arrangement has to be made relatively complicated to render manufacturing costs to be rather high and, in particular, the known system has not been able to be minimized in size, while it should be appreciated that the minimization in size of the responder is advantageous in view of the mountability to the moving object.

TECHNICAL FIELD

A primary object of the present invention is, therefore, to provide a moving object discriminating system which allows the circuit arrangement on the responder side simplified to lower the manufacturing costs and to minimize the size, so that the responder can be improved in the adaptability to the moving object without increasing transmission loss.

According to the present invention, this object can be attained by a moving object discriminating system in which a signal transmitted from the interrogator is received by the responder mounted onto the moving object, received signal is processed by a control means, a signal of data stored in the responder for the moving object is phase-modified and returned to the interrogator and a discrimination process for the object is carried out at the interrogator, wherein a phase modulator provided to the responder carries out a phase modulation with the data stored in the responder upon returning the signal to the interrogator.

Other objects and advantages of the present invention shall be made clear in the following description of the invention detailed with reference to preferred embodiments shown in accompanying drawings.

While the present invention shall now be explained with reference to the embodiments shown in the drawings, it should be appreciated that the intention is not to limit the invention only to these embodiments but rather to include all possible alterations, modifications and equivalent arrangements within the scope of appended claims.

DISCLOSURE OF PREFERRED EMBODIMENTS

Figures 1, 2:
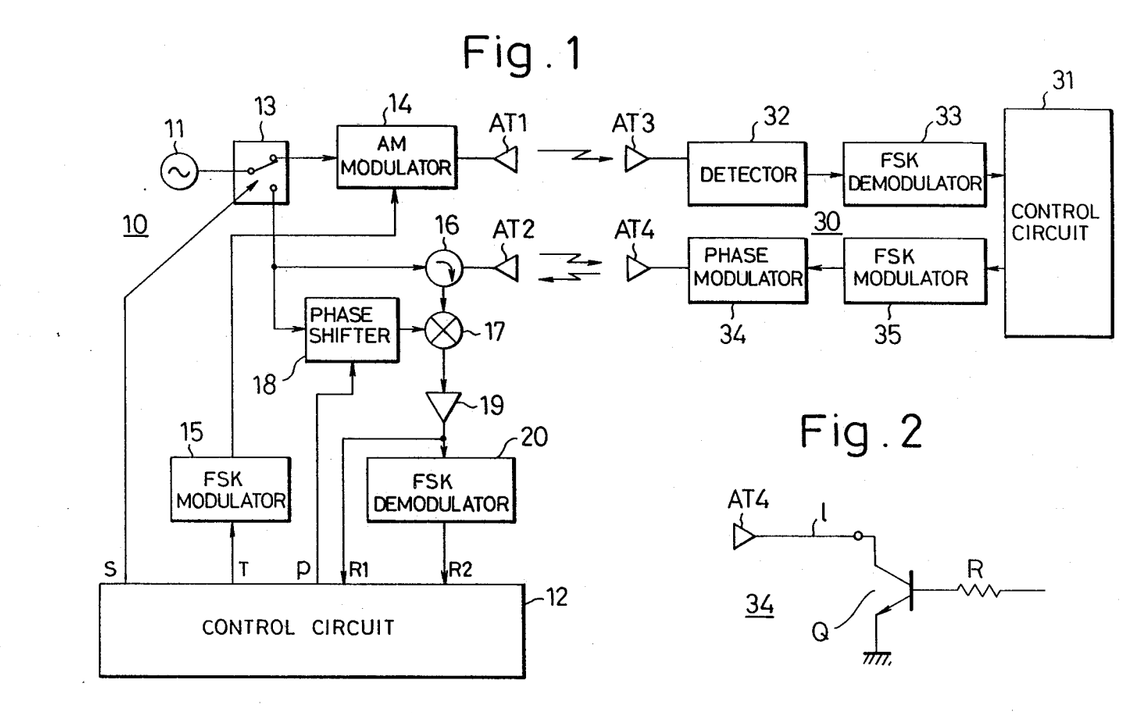
FIG. 1 shows in a block diagram an embodiment of the moving object discriminating system according to the present invention.
FIG. 2 is a circuit diagram showing in detail a phase modulator employed in the system of FIG. 1.

Referring to FIG. 1, the moving object discriminating system according to the present invention comprises generally an interrogator 10 which transmits a transmission signal, and a responder 30 which exchanges communication with the interrogator 10. Further in detail, the interrogator 10 includes an oscillator 11 which provides a non-modulated signal of fixed frequency towards the responder 30, and a control circuit 12, while the oscillator 11 is connected through a switch 13 connecting position of which is changed over by a switching signal S from the control circuit 12, to an AM modulator 14 to which an output of a frequency shift keying (which shall be referred to simply as "FSK") modulator 15 is also being provided, while this FSK modulator 15 provides an FSK signal into which the transmission data T are frequency modulated, as a data signal of a frequency higher than frequency component of the data T. In this case, the transmission data T are of such a digital signal as PWM or PCM signal of a logic value of "1" or "0" so that the output signal of the FSK modulator 15 will be either one of a signal of first frequency corresponding to the logic "1" or that of second frequency corresponding to the logic "0". Thus, the AM modulator 14 is arranged to receive the output signal from the FSK modulator 15 and AM-modulate the non-modulated signal from the oscillator 11 to have this modulated signal transmitted through an antenna AT1.

In the interrogator 10, further, a circulator 16 is connected to the switch 13, and this circulator 16 is connected to another antenna AT2 so that, when the switch 13 is changed by the switching signal S from the control circuit 12 over to the circulator 16 side, the non-modulated signal from the oscillator 11 will be provided to the antenna AT2 to be transmitted therethrough. The circulator 16 is also connected to a phase comparator 17 which is connected on the other hand to a phase shifter 18 and through an amplifier 19 to an FSK demodulator 20, the phase shifter 18 being connected to the same contact point 18 being as the one to which the circulator 16 is connected and to the control circuit 12 to receive therefrom a shifting phase amount controlling signal P to provide a signal responsive to a phase difference component to the FSK demodulator 20 through the amplifier 19. Here, output level of the phase comparator 17 is always monitored by the control circuit 12 by means of an output R1 of the amplifier 19 provided to the circuit 12 so that, when the level of the output signal R1 descends, the phase shifting amount at the phase shifter 18 is controlled by means of the shifting phase amount controlling signal P to shift the phase of a reference signal from the oscillator 11 so as to render the level of the signal R1 always the largest.

In the responder 30, on the other hand, there are included a control circuit 31, a series connection of an antenna AT3, a detector 32 and an FSK demodulator 33, and a further series connection of another antenna AT4, a phase modulator 34 and an FSK modulator 35, which are arranged so that an output of the detector 32 will be provided through the FSK demodulator 33 to the control circuit 31 while an output of the control circuit 31 will be provided through the FSK modulator 35 to the phase modulator 34. Accordingly, the AM-modulated waves received through the antenna AT3 are detected by the detector 32 and are reproduced at the FSK demodulator 33 to be the original data. The non-modulated signal from the antenna AT2 is received through the antenna AT4 by the phase modulator 34 where the signal is subjected to a phase modulation responsive to an FSK signal provided from the FSK modulator 35, and the thus modulated signal is transmitted back through the antenna AT4 to the antenna AT2 of the interrogator 10.

As the foregoing phase modulator 34, it is preferable to employ such one of an arrangement in which a terminating end of a transmission line 1 connected to the antenna AT4 is grounded through a transistor Q as shown in FIG. 2. That is, the terminating end of the transmission line 1 is opened upon turning off of the transistor Q but is short-circuited upon turning on of the transistor Q, so that the phase of the signal transmitted back from the antenna AT4 will be made to vary by 180 degrees as a result of state of the terminating end of the line 1 either opened or short-circuited. In other words, the phase modulator 34 of this arrangement allows the phase modulation performed by means of the turning on and off of the transistor Q, no substantial loss in the transmitted electromagnetic waves is caused at any part other than the transistor Q so as to render the transmission efficiency extremely excellent, and required circuit is simple enough for being contributive to a size minimization. In place of the transistor Q, it is possible to employ a switching circuit of a combination of a diode and low-pass filter.

Now, provided that the switch 13 in the interrogator 10 is changed over to the AM-modulator 14 side and the oscillator 11 is actuated, the non-modulated signal is provided to the AM-modulator 14, while the transmission data T from the control circuit 12 and modulated through the FSK modulator 15 into the FSK signal will be also provided to the AM-modulator 14. The non-modulated signal is AM-modulated at the AM modulator 14 with the FSK signal and is provided to the antenna AT1 to be transmitted therethrough. When the data stored in the responder 30, i.e., the data concerning a vehicle on which the responder 30 is mounted are intended to be read out by means of the interrogator 10, the switch 13 is changed over to the circulator 16 side. The non-modulated signal thereby sent to the circulator 16 side is transmitted as it stands through the antenna AT2 to the antenna AT4 of the responder 30, in which the signal is provided to the phase modulator 34 to be phase-modulated with the FSK signal from the FSK modulator 35, and the thus phase-modulated signal is transmitted back through the antenna AT4 to the antenna AT2 of the interrogator 10, where the transmitted-back waves or, in other words, reflection waves are provided through the circulator 16 to the phase comparator 17, and the signal responsive to the phase-difference component is provided from the phase comparator 17 through the amplifier 19 to the FSK demodulator 20 or directly to the control circuit 12. The signal R1 directly provided from the amplifier 19 to the control circuit 12 is maintained to be always at the largest level while the signal provided to the FSK demodulator 20 is reproduced therein to be the data R2 stored in the responder 30 and provided to the control circuit 12 for reading out the data.

It will be appreciated that the moving object discriminating system as has been disclosed with reference to FIGS. 1 and 2 is made simpler particularly in the circuit on the responder 30 side than any known system, so as to be sufficiently minimized in size for improving the adaptability to a wider range of type of the moving object.

Figure 3:
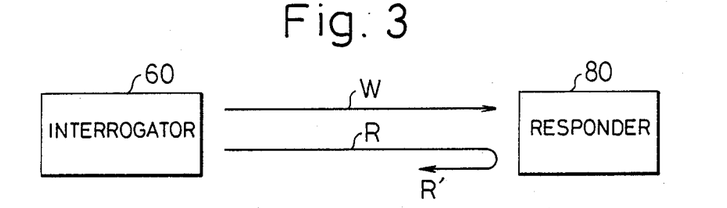
FIG. 3 is a diagram showing a principle of another embodiment of the system according to the present invention.

According to one of remarkable features of the present invention, the moving object discriminating system employs for the data transmission a circularly polarized wave and, more preferably, the circularly polarized waves of the same polarized or turning direction are employed, so that the data transmission reliability can be improved. Referring here to FIG. 3, the circularly polarized waves are employed as the transmission waves between an interrogator 60 and a responder 80, in particular, in transmitting from the interrogator 60 to the responder 80 a writing wave W together with a reading wave R for the transmission data. In this case, the reading wave R and writing wave W are made to be of circularly polarized waves mutually oppositely turning. When, for example, a left turning circularly polarized wave is employed as the reading wave R, the writing wave W is made to be of a right turning circularly polarized wave. In sufficiently minimizing the responder 80 no oscillator may be provided therein, and the reading wave R received at the responder 80, for example, is caused to be reflected back to have the transmission data carried by such reflected wave R'.

Figure 4:
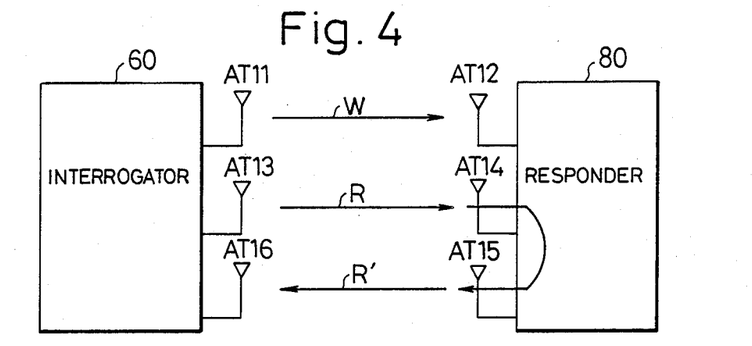
FIG. 4 shows more in detail in a principle diagram the system of FIG. 3.

Referring also to FIG. 4, it should be assumed here that the left turning circularly polarized wave is employed as the data writing wave W from the interrogator 60 to the responder 80, the writing wave W is to be transmitted through an antenna AT11 of the interrogator 60 for the left-turning circularly polarized wave, and received by the responder 80 through an antenna AT12 for the left-turning circularly polarized wave. On the other hand, the reading wave R is to be transmitted from the interrogator 60 through its antenna AT13 for the right-turning circularly polarized wave, and received by the responder 80 through its antenna AT14 for the right-turning circularly polarized wave. The responder 80 reflects back this received wave and, in the present instance, the data of the responder 80 are made to be carried by this reflected reading wave R' to be transmitted back through an antenna AT15 for the right-turning circularly polarized wave for reception by the interrogator 60 through an antenna AT16 for the right-turning circularly polarized wave.

Figures 5, 6:
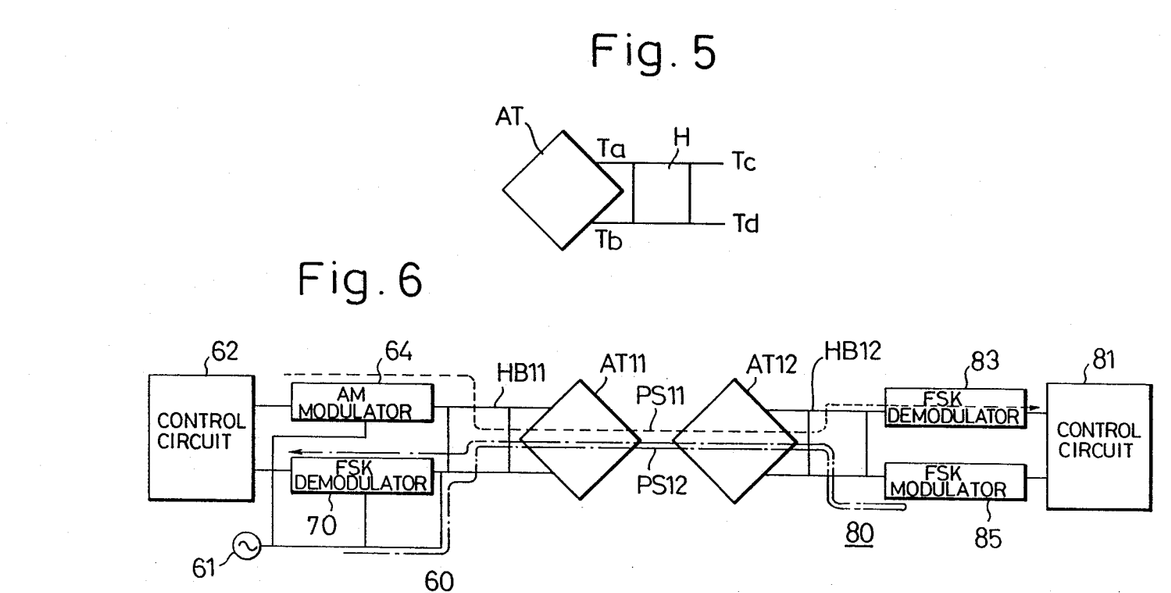
FIG. 5 is an explanatory view of an antenna employed in the system of FIG. 3.
FIG. 6 shows in a more concrete block diagram the system of FIG. 3.

For the respective antennas AT, such microstrip-line type antenna for the circularly polarized wave as shown in FIG. 5 which has been known per se may be employed, as provided with a hybrid circuit H, so that respective polarized wave planes of linearly polarized wave excited from a first terminal Ta and also of linearly polarized wave excited from a second terminal Tb will mutually intersect at right angles. The hybrid circuit H is connected to these first and second terminals Ta and Tb and, as the transmission wave is provided to a third terminal Tc while a fourth terminal Td is made to be no-reflection end, there is caused a phase difference of an excitation wave $\pi/2$ of the first and second terminals Ta and Tb, so that the circularly polarized wave will be radiated. The circularly polarized wave of the opposite directionally turning with respect to the thus radiated wave can be radiated by providing a transmission wave to the fourth terminal Td so as to render the third terminal Tc to be the no-reflection end. Upon reception, the radiations referred to are reversed, that is, the received wave output is provided out of one of the third and fourth terminals Tc and Td upon receipt of the circularly polarized wave, and no received wave output is provided from the other terminal.

With the foregoing antenna AT utilized, the present invention allows such bilateral data transmission arrangement as in FIG. 6 to be realized. In writing the data from the interrogator 60 into the responder 80, the data in the interrogator 60 are provided from a control circuit 62 to an AM-modulator 64 to be therein modulated, the thus modulated data are provided through a hybrid circuit HB to an antenna AT11 to be radiated thereout as the circularly polarized waves, which waves are received by an antenna AT12 of the responder 80. The received wave is made to pass through a hybrid circuit HB12, upon which the data are recorded at a data recording section in a control circuit 81 as passed through an FSK demodulator 83 without being provided to the side of FSK modulator 85 (refer to a transmission path PS11 shown by a dotted line in FIG. 6). When the interrogator 60 is to read the data of the responder 80, next, the non-modulated signal from the oscillator 61 is provided through a terminal on the side opposite to the AM-modulator 64 side to the hybrid circuit HB11, and a circularly polarized wave of a turning direction opposite to that upon the writing is radiated through the antenna AT11, due to which a received wave is provided in the hybrid circuit HB12 to the FSK modulator 85 side without being provided to the FSK demodulator 83 side. At the FSK modulator 85, the data at the data recording section in the control circuit 81 of the responder 80 is made to be carried by this received wave, which wave is then reflected back. This reflected wave is radiated again through the hybrid circuit HB12 and antenna AT12 of the responder 80 as a circularly polarized wave of the same turning direction as that of the transmitted wave from the interrogator 60, and is received by the interrogator 60. This received wave is provided through the hybrid circuit HB11 and the FSK demodulator 70, without being provided to the AM-modulator 64 side, to the data read section in the control circuit 62 of the interrogator 60, for reading the data from the responder 80 (refer to transmission path PS12 shown by a chain line in FIG. 6).

Figure 7:
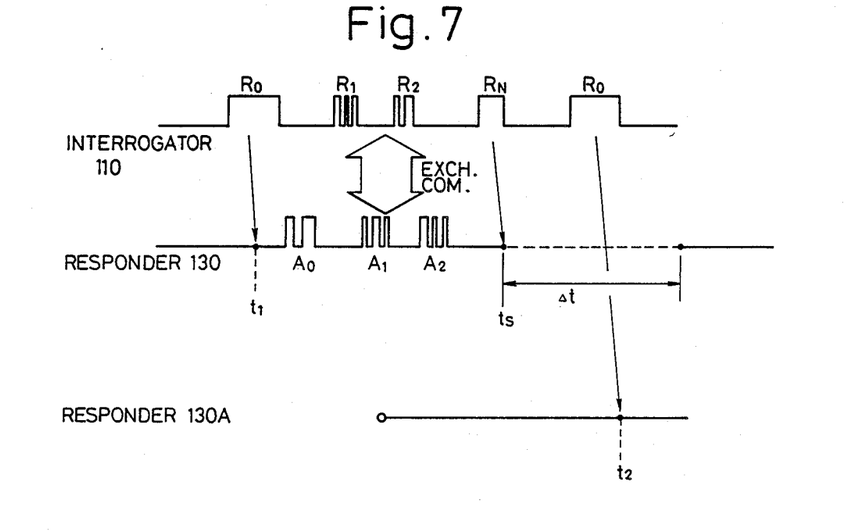
FIG. 7 is an explanatory view of still another embodiment of the system according to the present invention.

According to another feature of the present invention, there can be provided a moving object discriminating system in which a stationary interrogator can exchange communication sequentially with each of more than two moving responders present in an area for the moving object discrimination. Referring to FIG. 7, it is assumed here that one responder 130 mounted to a moving vehicle has received at a time $t_1$ a communication start requesting signal $R_0$ from an interrogator 110, and returns thereto an answer signal $A_0$ including a sort of information. In an event where a simpler discriminative information of the moving object only is to be transmitted, the system can take the simplest arrangement for allowing such discriminative information transmitted as the answer signal $A_0$. If on the other hand a transmission system which has both functions of the writing and reading of the information is preferred, it becomes necessary to have the communication exchanged according to a fixed procedure after the receipt by the responder 130 of the communication start requesting signal $R_0$. When, however, two responders 130 and 130A are concurrently present in the moving object discriminating area and both of them perform the communication exchange at a time $t_2$, the communication cannot be carried out in normal manner any more and the communication becomes likely to be interfered.

Here, the interrogator 110 is made to transmit a communication finish requesting signal $R_N$ upon termination or temporary interruption of the communication with one responder 130 at a time $t_s$, and the responder 130 is arranged to interrupt the communication for a fixed time $\Delta t$ once the communication finish requesting signal $R_N$ is received, so that the responder 130 will carry out no communication exchange for the fixed time $\Delta t$ even when the communication start requesting signal $R_0$ is transmitted from the interrogator 110 during this period. When the other responder 130A is present in the discrimination area, the transmitted requesting signal $R_0$ is responded to by the responder 130A by means of the answer signal $A_0$ as a receipt confirming signal, and the responder 130A starts the communication with the interrogator 110. That is, it is made possible for the interrogator 110 to carry out the communication sequentially with the both responder 130 and 130A even when they exist at the same time in the discrimination area. When it becomes necessary to communicate again with the initially communicated responder 130, the interrogator 110 transmits to the now communicating responder 130A the communication finish requesting signal $R_N$ to have its communication interrupted for the fixed time $\Delta t$, during which the interrogator 110 transmits the communication start requesting signal $R_0$ and the communication with the responder 130 can be restored.

Figure 8:
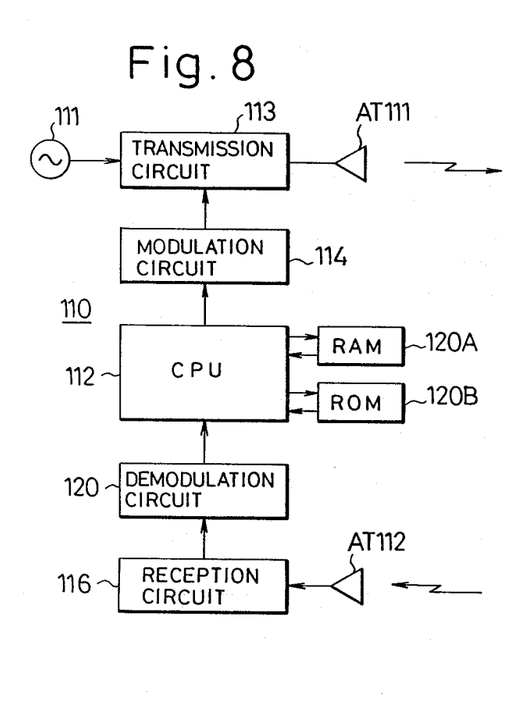
FIG. 8 is a brief block diagram showing an interrogator employed in the system of FIG. 7.

As shown in FIG. 8, the foregoing interrogator 110 may be formed by incorporating a computerized control means in the arrangement of the interrogator 10 of FIG. 1. That is, a CPU 112 is employed as the control circuit, which is provided with a RAM 120A for storing various data and a ROM 120B for storing operation programs and so on. The non-modulated signal from an oscillator 111 is provided to a transmission circuit 113 which receives an output of a modulation circuit 114 for the AM modulation while receiving an FSK modulation input, and therethrough to an antenna AT111 to be transmitted thereout. The reflected wave from the responder, on the other hand, is received at an antenna AT112 to be provided through a reception circuit 116 including such circulator, phase comparator, amplifier, phase shifter and so on as in the embodiment of FIG. 1, and through an FSK demodulation circuit 120, to the CPU 112.

Figure 9:
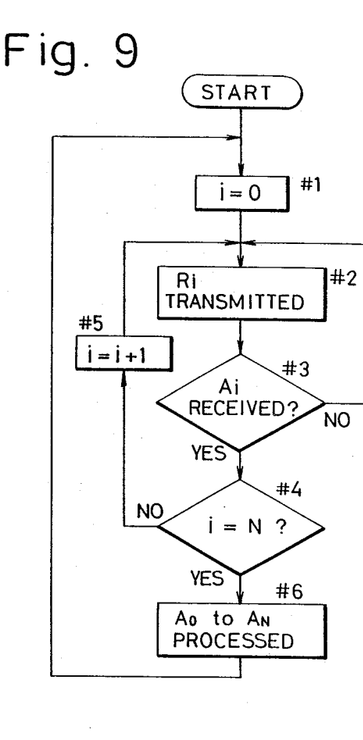
FIG. 9 is a flow-chart showing the operation of the interrogator in the system of FIG. 7.

Referring also to FIG. 9, the start of the operation of the interrogator 110 causes an answer requesting signal $R_i$ numbered to be $i=0$ at a step #1, and this answer requesting signal $R_i$ is transmitted at a step #2. This initially transmitted answer requesting signal $R_i=R_0$ is the communication start requesting signal. At a step #3, it is decided whether or not an answer signal $A_i$ to the answer requesting signal $R_0$ has been received, while the answer signal $A_0$ to the communication start requesting signal $R_0$ is the receipt confirming signal, and it is confirmed at the interrogator 110 that the responders 130 and 130A are in a state capable of performing the communication. In this receipt confirming signal, the discriminative information of the responders 130 and 130A may be included. At a step #4, it is decided whether the number i of the answer requesting signal $R_i$ has reached $i=N$, and any signal not of $i=N$ is counted up by adding 1 to the number i and is returned to the step #2.

The loop of the foregoing steps #2 to #5 is repeated to transmit the answer requesting signals $R_1$, $R_2$, $R_3$..., and the answer signals $A_1$, $A_2$, $A_3$... respectively corresponding to the above requesting signals are received. When the receipt of any answer signal $A_i$ has not been confirmed at the step #3, the step is returned to that of #2, the transmission of the answer requesting signal $R_i$ is performed once more, so that a loop of the steps #2 and #3 is repeated until the initial communication start requesting signal $A_0$ is received. When the answer requesting signal $R_i$ has reached $i=N$ at the step #4, it is meant that the communication finish requesting signal $R_N$ has been transmitted and the communication finish confirming signal $A_N$ has been received, and the step shifts to #6 to have the received answer signals $A_0$ to $A_N$ processed.

Figure 10:
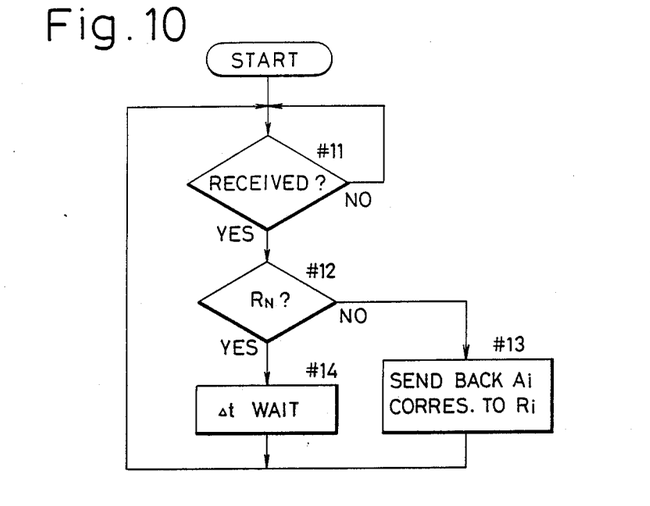
FIG. 10 is a flow-chart showing the operation of a responder employed in the system of FIG. 7.

The responders 130 and 130A may be formed substantially in the same arrangement as the interrogator 110 shown in FIG. 8, but their operation should be distinct. For the antennas, they may be arranged so as to obtain the circular polarized waves of the same turning direction upon the transmission, reception or reflection as has been referred to with reference to the embodiment of FIGS. 3 to 6. Referring to the operation of the responders 130 and 130A with reference in conjunction to FIG. 10, it is decided at a step #11 whether or not the answer requesting signal is received, and, in the absence of its reception, the responder is kept in waiting state until the receipt is acknowledged. This means that the responder is positioned outside the moving object discriminating area. Once the responder enters the area and receives the answer requesting signal, the step shifts to #12 to determine whether or not the answer requesting signal $R_i$ is the communication finish requesting signal $R_N$. So long as the former signal $R_i$ is not determined to be the communication finish requesting signal $R_N$, the step shifts to #13 to have the answer signal $A_i$ corresponding to the received answer requesting signal $R_i$, and the step is returned to #11. At the initial stage, the communication start requesting signal $R_0$ is received so that the reception confirming signal $A_0$ is transmitted back Following this, the answer signals $A_1$, $A_2$, $A_3$... are transmitted back respectively in correspondence to the answer requesting signals $R_1$, $R_2$, $R_3$... It is likely that the answer requesting signals $R_1$, $R_2$, $R_3$... include a writing signal or a control signal for the responder 130 or 130A, in which event the writing or control confirming signal is transmitted back. As the communication finish requesting signal $R_N$ is eventually received, the step shifts from #12 to #14, whereby the communication is caused to be interrupted for the time $\Delta t$. Preferably, the non-modulated signal is employed as the communication finish confirmation signal $A_N$. It is preferable that the circuit employed in the interrogator 110 or responder 130 or 130A is formed in a chip as required.

Figure 11:
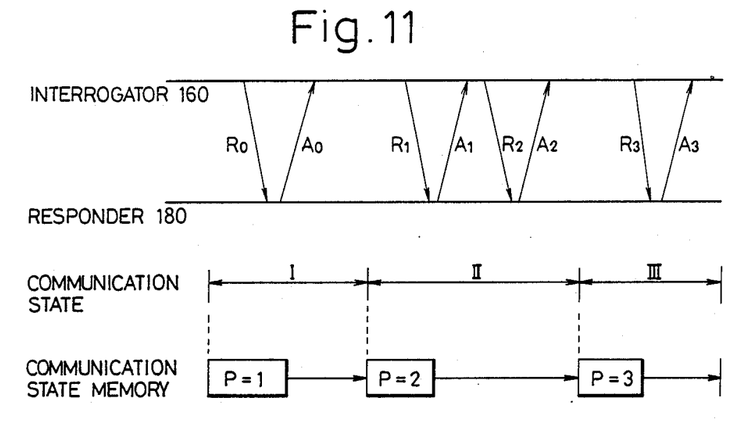
FIG. 11 is an explanatory diagram for a further embodiment of the present invention.

According to the present invention, further, there can be provided another aspect of the moving object discriminating system which allows any interference in the communication to be avoided even when more than two of the responders are present in the moving object discriminating area. Referring now to FIG. 11, an interrogator 160 transmits to responders 180 the answer requesting signals $R_0$ to $R_3$, and the responders 180 transmit back to the interrogator 160 the answer signals $A_0$ to $A_3$. Respective states of the communication are divided into three states I to III depending on contents of information dealt with, and the answer requesting signals Ri dealt with at every state are assigned to the respective communication states I to III Their order, priority and so on are predetermined in a manner suitable for the usage of the system in respect of the transition of the communication state, so that the communication of the interrogator 160 with the respective responders 180 will be carried out in accordance therewith, whereby in the illustrated embodiment the answer requesting signal $R_0$ and answer signal $A_0$ are transmitted in the state I, the answer requesting signals $R_1$ and $R_2$ and answer signals $A_1$ and $A_2$ are in the state II and the answer requesting signal $R_3$ and answer signal $A_3$ are in the state III, upon which the communication state of the responders 180 may be stored in their own communication-state memory P so as to be $P=1$, $P=2$, $P=3$... for the respective communication states I to III.

In the case of a system in which the data communication shows a transition in the order of the states I, II, III ... as the simplest aspect, contents in the communication state memory P will be rewritten to be P=1, P=2, P=3 ... so that, even when a plurality of the responders 180 are present in the discrimination area, the responder which has first started the communication with the interrogator is made to renew its communication state in the memory P so as to be different in the contents of the memory P from those in another responder later entered the discriminating area and next started the communication. Provided here that the responders 180 are to carry out the communication always in the sequence of the states I, II, III ..., for example, and that the first one of the responders 180 has already entered the discrimination area and been in the state II of receiving the answer requesting signals $R_1$ and $R_2$, then another responder entering the area next and starting the communication next is made not to receive these answer requesting signals and kept in waiting state until the answer requesting signal $R_0$ will be received. Accordingly, the plurality of responders are allowed to be capable of communicating with the interrogator 160 without causing any mutual interference.

For the interrogator 160, the same arrangement as shown in FIG. 8 can be employed, and its operation may be made identical to that of FIG. 9. The responders 180 may also be made identical with that shown in FIG. 8 while the operation should be made distinct. Referring to the operation of the responder 180, therefore, with reference in conjunction to FIG. 12, the communication state memory is set at a step #21 initially to be P=1 so as to store that the communication is of the state I. At a next step #22, the presence or absence of the receipt of any answer requesting signal is determined and, in the absence thereof, the responder 180 is kept in waiting state until the signal reception. This state means that the responder 180 is outside the discrimination area. As the responder 180 enters the discrimination area and receives the answer requesting signal, a step #23 is reached to determine if the received answer requesting signal $R_i$ is the communication finish requesting signal $R_N$ or not. When the signal $R_i$ is determined not to be the communication finish requesting signal $R_N$, a step #24 is reached to determine whether or not the answer requesting signal $R_i$ includes a request for an answer occurring in the communication state P. When the answer requesting signal $R_i$ is determined at the step #24 as including the answer request for the communication state P, the step shifts to #25, where a determination is made if such a command as any control signal or writing signal or the like with respect to the responder 180 is included. In the presence of such command, the step shifts to #26 to process the command to shift the step to #27, whereas in the absence of the command the step to #27 is promptly reached.

Figure 12:
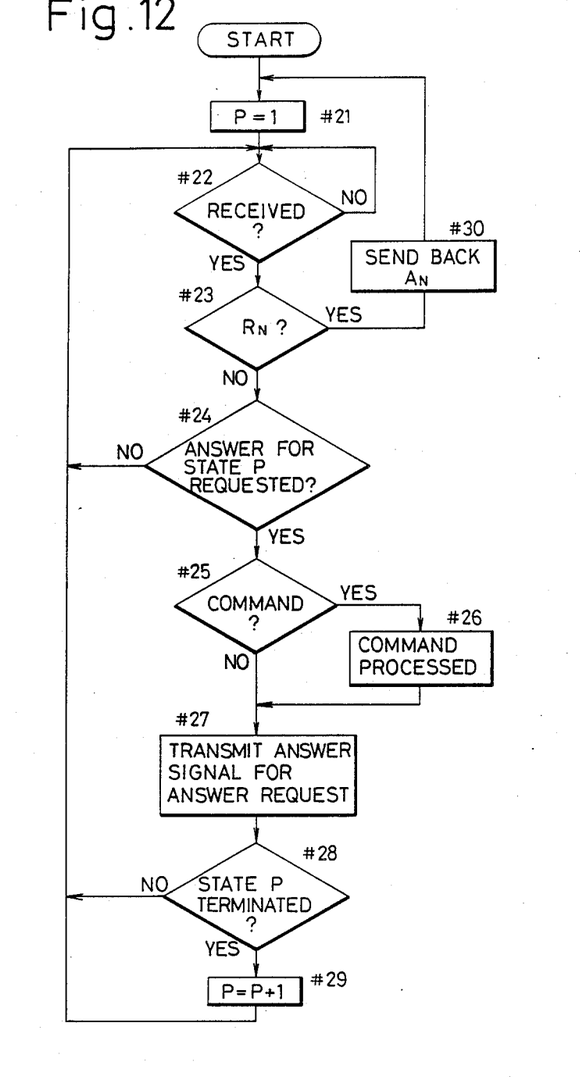
FIG. 12 is a flow-chart showing the operation of the responder employed in the system of FIG. 11.

At the step #27, an answer signal $A_i$ corresponding to the answer request signal $R_i$ is transmitted, and the step shifts to #28. As the communication start request signal $R_0$ is initially received, the receipt confirming signal $A_0$ is returned. Thereafter, the answer signals $A_1$, $A_2$, $A_3$ ... are returned in correspondence with the answer requesting signals $R_1$, $R_2$, $R_3$ ... When such command as has been referred to is included in the latter signals, a command confirming signal is transmitted back. At the step #28, it is determined whether or not the communication at the state P has been terminated so that, when the termination of the state P communication is determined, a "one" counting up of the communication state memory P is made at a next step #29 whereas, when the state P communication is determined not terminated as yet, the step is returned to #22 without varying the communication state memory P.

The determination of whether or not the state P communication is terminated can be realized by a preliminary storage of, for example, the communication number to be carried out at every communication state, and it may also be possible to determine that the communication at any state is terminated by means of a receipt of the predetermined answer request signal. When the communication finish requesting signal $R_N$ is received, the step #23 shifts to a step #30, where the communication finish confirming signal $A_N$ is sent back, the step is then returned to #21 and thereafter the same operation is repeated.

Figure 13:
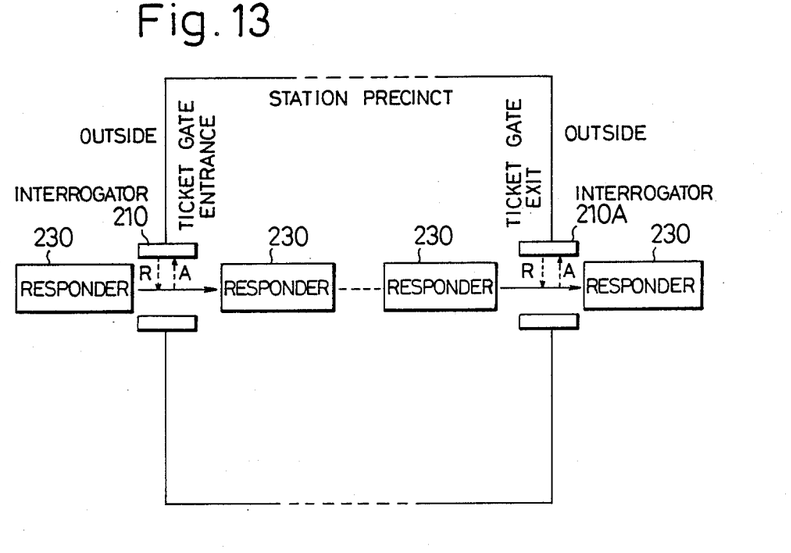
FIG. 13 is an explanatory view for yet another embodiment of the system according to the present invention.

The foregoing arrangement of the system according to the present invention can be utilized as an automatic, non-contacting ticket gate system. Referring to FIG. 13, a station precinct is provided with ticket gate entrance and exit where the interrogator 210 and 210A are respectively provided. A non-contacting type ticket carried by every passenger incorporates therein or is provided with a responder 230 in the present instance stores, for example, two states I and II, the state I of which shows the distinction between the "inside" and "outside" of the station precinct while the state II of which represents the distinction between "confirmed" and "unconfirmed" states. When the responder 230 is outside the discrimination area of the station precinct the entrance of which is defined by the interrogator 210, the state I is of the "outside" and the state II is of "confirmed". As the responder 230 passes along the entrance interrogator 210 to enter the discrimination area, the answer requesting signal R periodically transmitted out of the interrogator 210 is received by the responder 230, the latter determines from contents of the answer requesting signal R that the interrogator 210 is of the entrance and rewrites the state I to "inside" and the state II to "unconfirmed". Thereafter, the responder 230 transmits the answer signal A and waits for the receipt confirming signal from the interrogator 210. In the event of absence of the receipt confirming signal after a predetermined time lapsed, the answer requesting signal R is again received by the responder 230, the transmission of the answer signal only is carried out without the rewriting of the states I and II and the responder 230 waits for a receipt of the receipt confirming signal again.

Upon receipt at the responder 230 of the receipt confirming signal from the interrogator 210, the responder 230 rewrites its state II to "confirmed" and returns to the state of waiting for the answer requesting signal R. The rewriting is not carried out even when the answer requesting signal R is received from the interrogator 210 at the ticket gate entrance in this waiting state of the responder 230, but the rewriting is made upon receipt of the answer requesting signal R from the other interrogator 210A at the ticket gate exit, through an operation carried out in a manner opposite to the above.

It should be appreciated that, when a plurality of the responders 230 are present in the discrimination area defined by the interrogator 210 and 210A in the system of FIG. 13, the system is provided with such arrangement as has been explained with reference to FIGS. 1 to 12 for performing the same operation, so that a highly precise moving object discrimination can be realized while effectively avoiding any missing discrimination or double discrimination of any one of the objects carrying the responders.

Figure 14:
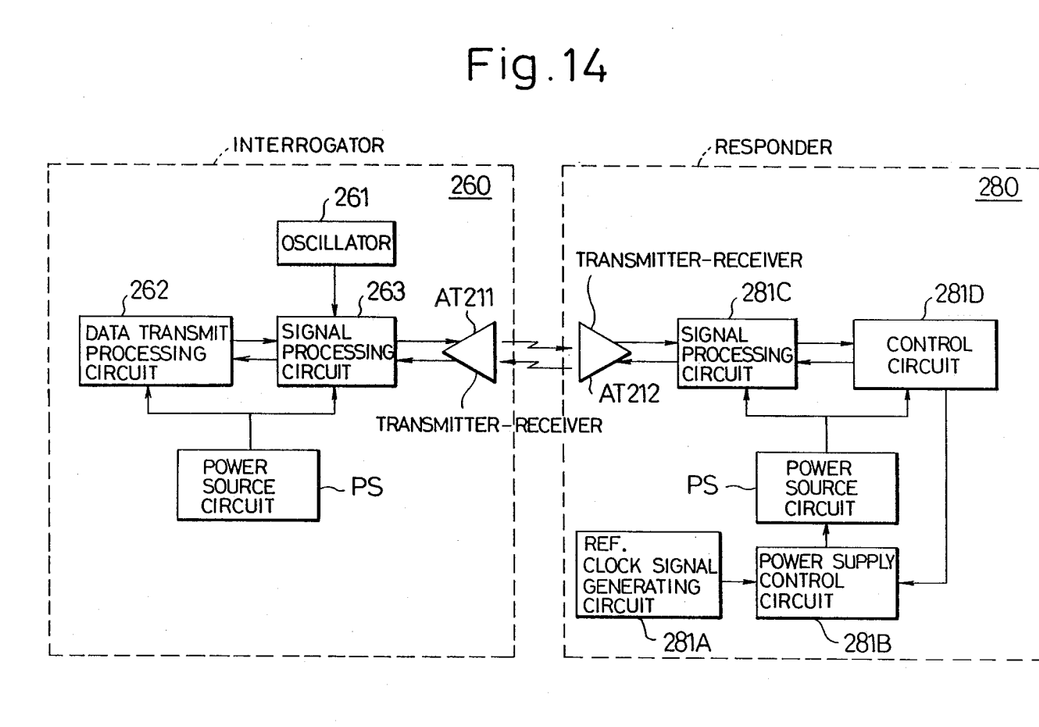
FIG. 14 shows in a block diagram a still further embodiment of the system according to the present invention.

According to the present invention, the moving object discriminating system is provided in still another aspect which prevents any interference likely to occur when more than two of the responders enter the moving object discrimination area. Referring now to FIG. 14 in which the fundamental technical matters of an interrogator 260 and responder 280 are substantially the same as has been described, the interrogator 260 in the present embodiment comprises an oscillator 261 which oscillates a non-modulation signal of a fixed frequency, a control circuit 262 for transmission and processing of data and the like, a signal processing circuit 263 which receives said signal from the oscillator 261 and connected to the control circuit 262, a power source circuit PS for supplying an electric power to the control circuit 262 and signal processing circuit 263, and a transmitter-receiver AT211 for transmitting an output signal from the signal processing circuit 263 to the responder 280 and receiving an output from the responder 280. On the other hand, the responder 280 comprises a transmitter-receiver AT212 which transmits and receives the signals, a reference clock signal generating circuit 281A which controls intermittent operation of the responder 280, a power supply control circuit 281B which turns on and off a power source circuit PS for the responder 280, a signal processing circuit 281C receiving supplied power from the power source circuit PS and connected to the transmitter-receiver AT212 for carrying out signal amplification and so on, and a further control circuit 281D similarly receiving supplied power from the circuit PS and connected to the signal processing circuit 281C for providing an output to the power supply control circuit 281B.

Now, the data are provided from the control circuit 262 in the interrogator 260 to the signal processing circuit 263, the output signal of the oscillator 261 is AM-modified at the signal processing circuit 263 and is transmitted through the transmitter AT211 to the responder 280. In this responder 280, such circuit parts of relatively small electric current consumption as modulating and demodulating circuit elements comprising, for example, CMOS logic circuit and the like are always in their operating state. On the other hand, such circuit parts of relatively large electric current consumption as amplifying circuit in the signal processing circuit 281C, data transmitting and processing control circuit 281D or the like are to be intermittently driven, depending on the operation of the power source circuit PS which is turned on and off by an output of the control circuit 281B actuated by the reference clock signal generating circuit 281A. In this case, the average consumption current of the responder 280 can be made smaller as the time for which the operation of the circuit is interrupted is made longer than the operation time. The control circuit 281D for the data transmission and processing also provides to the power supply control circuit 281B a signal requesting continuity of the power source ON state.

When the power source circuit PS of the responder 280 is in the ON state and the responder 280 is thus in operating state, the transmitted signal from the interrogator 260 to the responder 280 is received by the latter, an output of the transmitter-receiver AT212 is demodulated through the demodulator of the signal processing circuit 281C to have the data restored to the original state and the data are provided to the control circuit 281D which provides the continuity requesting signal to the power supply control circuit 281B, and the operating state of the responder 280 is continued. The data transmitting and processing control circuit 281D processes the data and provides an answer signal which is provided through the signal processing circuit 281C to the transmitter-receiver AT212 to be transmitted therethrough to the interrogator 260.

Figure 15:
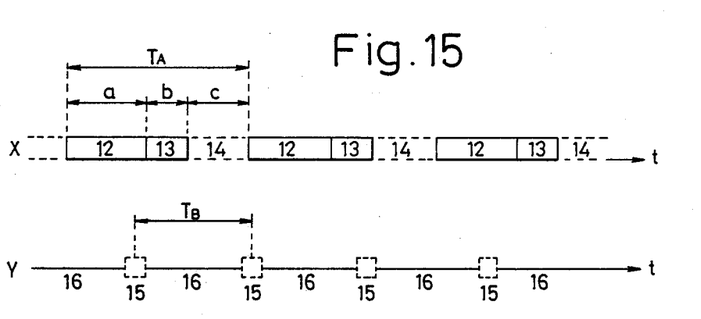
FIGS. 15 and 16 are diagrams showing signal patterns employed respectively in the system of FIG. 14.

Referring here to FIG. 15, the data transmission arrangement in the embodiment of FIG. 14 shall be explained. In the drawing, "X" denotes a signal pattern of the interrogator 260 while "Y" denotes a signal pattern of the responder 280, in which the interrogator 260 repeats the signal transmission and signal receipt waiting states at a constant cycle $T_A$, which including time bands "a" and "b" for providing respectively a preamble signal 12 having no specific code and a specific code signal 13 having an inherent code, respectively. These preamble signal 12 and specific code signal 13 are forming the answer requesting signal. An answer waiting state 14 having a further time band "c" follows next, for the interrogator 260. The responder 280, on the other hand, is intermittently operated at a cycle of $T_B$, in which an operating state 15 and rest state 16 are alternately repeated. In this case, it is optimum that respective time bands are set to be $a >> b+c$ in order that any detection failure of the responder 280 can be prevented.

Now, upon receipt at the responder 280 of the preamble signal 12, the intermittent operation as in FIG. 15 of the responder 280 is changed over to the state of continuously receiving operation, and the communication is started next upon receipt of the specific code signal 13. That is, the responder 280 comes into its operating mode at the time when the preamble signal is received.

Figure 16:
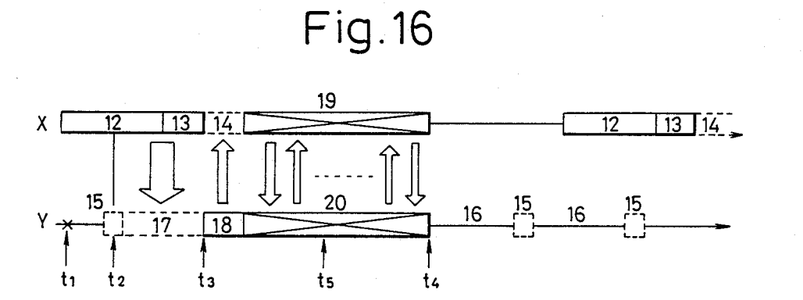

Referring next to the operation of the present embodiment with reference also to FIG. 16, it is assumed here that the responder 280 enters the discrimination area of the interrogator 260 at a time $t_1$, the responder 280 starts receiving the preamble signal 12 at a time $t_2$ and comes into the continuous receiving operating state 17 to receive the specific code signal 13. When the result of reading at the responder 280 is acknowledgeable, the responder 280 sends back an acknowledge signal 18 at a time $t_3$ when the interrogator 260 is in the time band "c" of the answer waiting state 14, to come into the communication exchanging state, and the interrogator 260 and responder 280 are both in communication state 19 and 20. When the result of the reading at the responder 280 is not acknowledgeable, no responsive operation takes place at the responder 280, which returns to the intermittently operating state. As the communication between the interrogator 260 and the responder 280 is finished at the time $t_4$, their operating state held prior to the communication restores after the time $t_4$.

When, on the other hand, another responder enters the discrimination area of the interrogator 260 at a time $t_5$, this another responder is made to be in the state of waiting for a receipt of any signal from the interrogator 260 but the preamble signal 12 and specific code signal 13 are not to be generated in the communication state 19 of the interrogator 260, and this another responder does not reach the continuous receiving state. Accordingly, the communication exchange of the responder which has entered the discrimination area prior to any other responder which has entered later can never be interfered. If there is a risk that any signal similar to the signal from the interrogator 260, in particular to the specific code signal is contained in the signal from the interrogator 260, the specific code signal 13 is provided with an end mark which shows the termination of the data and different in the signal level, while the answer waiting state 16 is made to follow the end mark and the responder is made to generate the answer signal only when their arrangement is read out, and the another responder can be prevented from being operated erroneously.

What we claim as our invention is:

1. A moving object discriminating system comprising an interrogator which transmits a transmission signal, and a responder which is mounted to a moving object and stores data for said moving object, said responder including a control means for processing said transmission signal received from said interrogator and for answering said interrogator, wherein said responder further including a phase modulator which modulates the phase of an answer signal supplied from said responder to said interrogator with said data stored in the responder, and said interrogator further including means for processing said answer signal to discriminate therefrom said moving object, an oscillator which oscillates a non-modulated signal of a fixed frequency toward said responder, and a comparator for comparing the phase of said oscillated signal with that of said answer signal from said responder and a phase shifter disposed between said oscillator and said phase comparator for providing a phase shift to an output of said oscillator so as to provide the phase comparator with a reference signal to permit the phase comparator to generate a sufficient demodulating output for processing said answer signal.

2. A moving object discriminating system comprising an interrogator which transmits a transmission signal, and a responder which is mounted to a moving object and stores data for said moving object, said responder including a control means for processing said transmission signal received from said interrogator and for answering said interrogator, wherein said responder further including a phase modulator which modulates the phase of an answer signal supplied from said responder to said interrogator with said data stored in the responder, and said interrogator further including means for processing said answer signal to discriminate therefrom said moving object wherein said interrogator and responder are respectively provided with means for transmitting and receiving said data with a circularly polarized wave, said transmitting and receiving means of the interrogator and responder being of said circularly polarized waves mutually of the same turning direction and wherein a writing wave and a reading wave are employed for said data transmission between said interrogator and said responder, said circularly polarized wave employed for said writing wave being of one turning direction while the circularly polarized wave employed for said reading wave being of opposite turning direction.

3. A moving object discriminating system comprising an interrogator which transmits a transmission signal, and a responder which is mounted to a moving object and stores data for said moving object, said responder including a control means for processing said transmission signal received from said interrogator and for answering said interrogator, wherein said responder further including a phase modulator which modulates the phase of an answer signal supplied from said responder to said interrogator with said data stored in the responder, and said interrogator further including means for processing said answer signal to discriminate therefrom said moving object and means for providing a communication finish requesting signal upon termination of a series of communication operations, and said responder further comprises means for interrupting said communication operations with the interrogator for a predetermined time after receipt of said communication finish requesting signal.

4. A moving object discriminating system comprising an interrogator which transmits a transmission signal, and a responder which is mounted to a moving object and stores data for said moving object said responder including a control means for processing said transmission signal received from said interrogator and for answering said interrogator, wherein said responder further including a phase modulator which modulates the phase of an answer signal supplied from said responder to said interrogator with said data stored in the responder, and said interrogator further including means for processing said answer signal to discriminate therefrom said moving object and means for transmitting an answer requesting signal at a predetermined communicating sequence; and said responder comprises means for storing its own communicating state in said communicating sequence of said answer requesting signal from the interrogator, and a state determining means which determines whether or not the answer requesting signal received coincides with said its own communicating state and restricts said transmission of said answer signal when the communicating state is inconsistent.

5. A moving object discriminating system comprising an interrogator which transmits a transmission signal, and a responder which is mounted to a moving object and stores data for said moving object, said responder including a control means for processing said transmission signal received from said interrogator and for answering said interrogator, wherein said responder further including a phase modulator which modulates the phase of an answer signal supplied from said responder to said interrogator with said date stored in the responder, and said interrogator further including means for processing said answer signal to discriminate therefrom said moving object and wherein said responder further includes means for storing preliminary a specific code signal, and starts a continued operation when a specific code signal received from said interrogator coincides with an stored specific code signal.

6. A system according to claim 5, wherein said interrogator adds to said specific code signal an end mark of a different signal level from the specific code signal, said end mark being followed by an answer waiting state.

* * * * *